(12) United States Patent
Mitchell et al.

(10) Patent No.: US 7,095,561 B2
(45) Date of Patent: Aug. 22, 2006

(54) COMPACT TELEPHOTO IMAGING LENS SYSTEMS

(75) Inventors: Thomas A. Mitchell, Nazareth, PA (US); Thomas W. Stone, Hellertown, PA (US)

(73) Assignee: Wavefront Research, Inc., Bethlehem, PA (US)

( * ) Notice: Subject to any disclaimer, the term of this patent is extended or adjusted under 35 U.S.C. 154(b) by 33 days.

(21) Appl. No.: 10/901,602

(22) Filed: Jul. 28, 2004

(65) Prior Publication Data

US 2005/0024731 A1    Feb. 3, 2005

Related U.S. Application Data

(60) Provisional application No. 60/491,182, filed on Jul. 29, 2003.

(51) Int. Cl.
*G02B 27/10* (2006.01)
(52) U.S. Cl. .................. 359/622; 359/621; 359/619; 359/448
(58) Field of Classification Search ............. 359/619, 359/621, 623, 624, 448, 449, 463, 569, 628, 359/668; 352/50, 58; 396/306; 349/5, 70; 430/644
See application file for complete search history.

(56) References Cited

U.S. PATENT DOCUMENTS

| | | | | |
|---|---|---|---|---|
| 4,208,086 A * | 6/1980 | Perry | ................... | 359/32 |
| 4,621,897 A * | 11/1986 | Bonnet | ................... | 359/462 |
| 5,059,008 A | 10/1991 | Flood et al. | ................... | 359/196 |
| 5,420,718 A * | 5/1995 | Davies et al. | ................... | 359/448 |
| 5,420,720 A * | 5/1995 | Gal et al. | ................... | 359/622 |
| 5,463,498 A * | 10/1995 | Gal et al. | ................... | 359/622 |
| 5,650,876 A * | 7/1997 | Davies et al. | ................... | 359/622 |
| 6,456,436 B1 * | 9/2002 | Miura et al. | ................... | 359/619 |
| 6,469,830 B1 | 10/2002 | Dubin et al. | ................... | 359/449 |

OTHER PUBLICATIONS

J. Duparre et al. (Jul. 2003) "Numerical wave optical analysis of microlens array telescopes and comparison with experimental results." Applied Optics 42(19) 3992-4001.

U.S. Appl. No. 60/491,182 filed Jul. 29, 2003 entitled "Compact Telephoto Imaging Lens Systems" for Thomas A Mitchell et al.

Duncan, A. et al. (2002) "Multiple Aperture Telescope Array with a High Fill Factor." Highly Innovative Space Telescope Concepts, H.A. MacEwen, Ed. Proc. of SPIE vol. 4849, 257-268.

* cited by examiner

*Primary Examiner*—Loha Ben
(74) *Attorney, Agent, or Firm*—Burns & Levinson LLP; Jacob N. Erlich; Orlando Lopez

(57) ABSTRACT

An optical system including an array of micro-optic afocal optical subsystems capable of receiving electromagnetic radiation from a source and of transmitting at least a portion of the electromagnetic radiation received from the source, and an imaging subsystem capable of receiving electromagnetic radiation from the an array of micro-optic afocal optical subsystems and imaging at least a portion of the received electromagnetic radiation onto an image plane.

17 Claims, 7 Drawing Sheets

COMPACT TELEPHOTO IMAGING LENS SYSTEMS

CROSS REFERENCE TO RELATED APPLICATIONS

This application claims priority of U.S. Provisional Application 60/491,182 filed on Jul. 29, 2003, which is incorporated by reference herein.

BACKGROUND OF THE INVENTION

This invention relates to compact imaging systems, and, more particularly, to imaging systems having small telephoto ratios.

An imaging lens (or lens system, also referred to as an imager) is commonly used to observe objects or scenes, whereby light emitted or reflected by a given object or scene is imaged by some means onto a detecting element, where it can readily be observed or recorded.

Because the field of view of an imaging lens is related to its focal length, narrow field of view imagers tend to have longer focal lengths. It is therefore desirable in many cases to constrain the overall length of the optical system while maintaining a long focal length. The telephoto ratio of an imaging system is given as the ratio of the overall length, measured from the foremost optical element to the image plane (or detecting element), to its effective focal length. This is achieved in a number of ways including the classical solution comprised of positive and negative powered element groupings as well as folded mirror or catadioptric systems. While these approaches can provide some shortening of long focal length imaging systems, they have practical limitations.

An afocal lens system is a system that images an object, located a large distance away from the system, to an image plane, also located a large distance away from the system, with some angular magnification. Afocal attachments have conventionally been used to change the effective focal length of an optical imaging system by providing angular magnification at the pupil.

In many designs incorporating optical systems, there is a need for the overall system to be compact. Such needs stem from weight and space constraints in the application in which the system is used. Conventional afocal attachments have been used to change the focal length of an optical imaging system, but are limited in their ability to provide small telephoto ratios, since they contribute substantial size and mass to the imaging system in order to achieve the desired angular magnification and field of view.

There is therefore a need for an imaging system that is more compact in physical size than current imaging systems.

Furthermore, there is also a need for an imaging system that has a smaller telephoto ratio than current imaging systems.

Still further, there is a need for an imaging system that provides a combination of the characteristics described above with superior trade-offs than have been previously attainable.

BRIEF SUMMARY OF THE INVENTION

The needs for the invention set forth above as well as further and other needs and advantages of the present invention are achieved by the embodiments of the invention described hereinbelow.

An optical system of this invention includes an array of micro-optic afocal optical subsystems capable of receiving electromagnetic radiation from a source and transmitting at least a portion of the electromagnetic radiation received from the source, and an imaging subsystem capable of receiving electromagnetic radiation from the array of micro-optic afocal optical subsystems and imaging at least a portion of the received electromagnetic radiation onto an image plane.

In the present invention the afocal attachments are miniaturized and tiled into an array, which is placed in front of an imaging lens subsystem. These arrays can comprise, but are not limited to, micro-optic elements that are arranged in proximity to one another. The angular magnification of the afocal lens systems (which includes the array) can be used to convert a narrow field of view into a wider angular field for a shorter focal length imaging lens system than without the array. In this manner, the effective focal length of the imaging lens system can be greatly increased with little increase in overall length, thereby substantially reducing the telephoto ratio of the imaging lens systems.

For a better understanding of the present invention, together with other and further needs thereof, reference is made to the accompanying drawings and detailed description and its scope will be pointed out in the appended claims.

DETAILED DESCRIPTION OF THE INVENTION

Compact optical systems, having a small telephoto ratio, are disclosed hereinbelow.

The terms "micro-optics" and "micro-optical component" as used herein, refer to optical components having apertures substantially smaller than the entrance pupil of the conventional optical imaging subsystems discussed herein. The micro-optical components can be refractive, diffractive or reflective or any combination thereof. Exemplary micro-optical components include, but are not limited to, micro-lenses, GRIN rod lenses, micro-mirrors and micro-prisms.

The term "gradient index rod lens" as used herein, refers to radial gradient index optical components.

Figure 1:
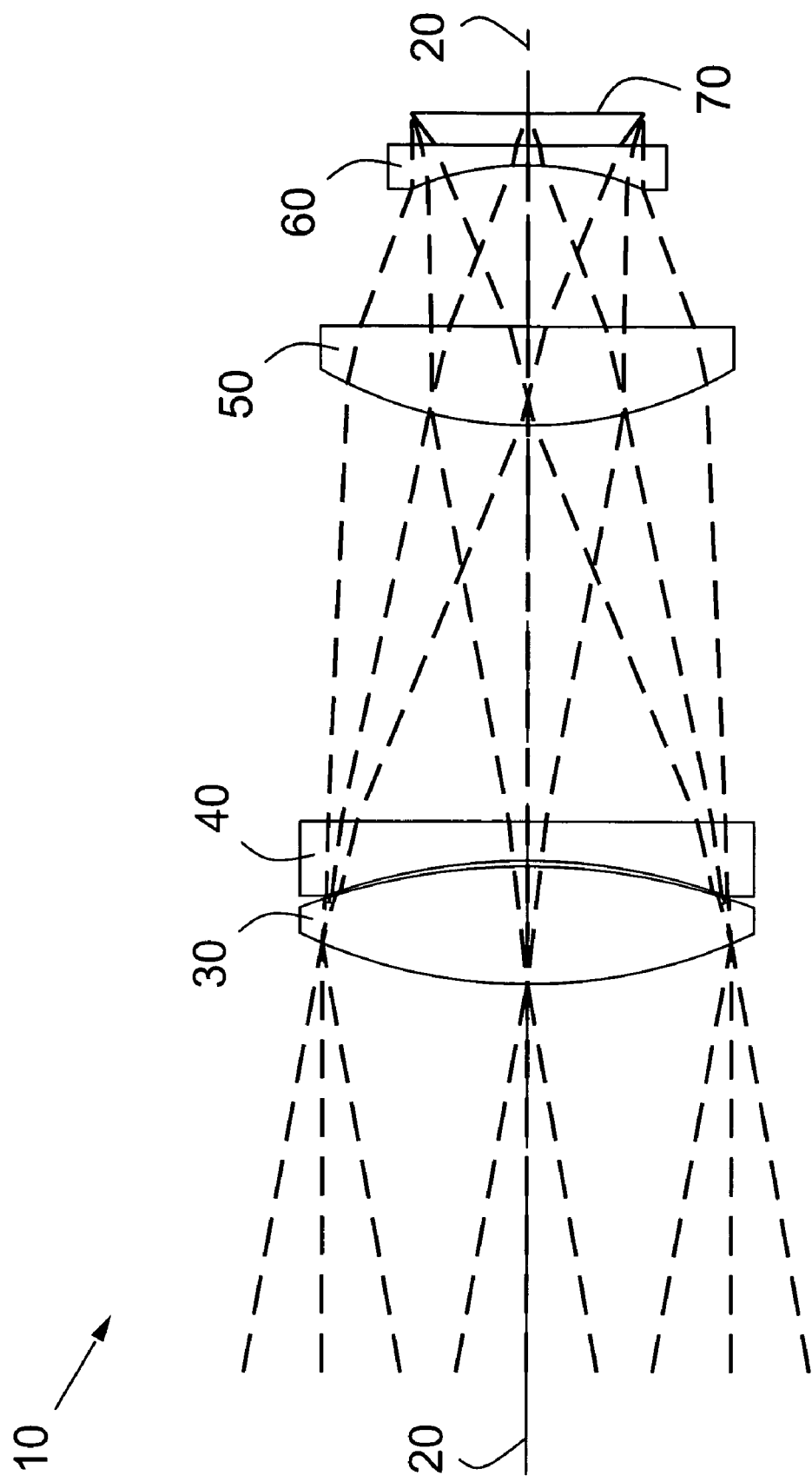
FIG. 1 is a schematic sectional view of a conventional imaging system, taken along the optical axis.

Reference is made to FIG. 1, which is a schematic sectional view of a conventional imaging system 10, taken along the optical axis 20. Electromagnetic radiation, typically in, but not restricted to, the ultraviolet, visible and/or infrared bands, hereinafter referred to generally as light, emitted or reflected by a given object, either real or virtual, hereinafter also referred to as a source, is imaged through an optical system 10 comprised of a combination of optical elements, in this embodiment consisting of refractive elements 30, 40, 50, and 60, onto an image plane 70. In some applications, although not a limitation of this invention, a CCD array, phosphorescent screen, photographic film, microbolometer array, or other means of detecting light energy, hereinafter referred to generally as a detecting element, is substantially located at the image plane 70.

Figure 2:
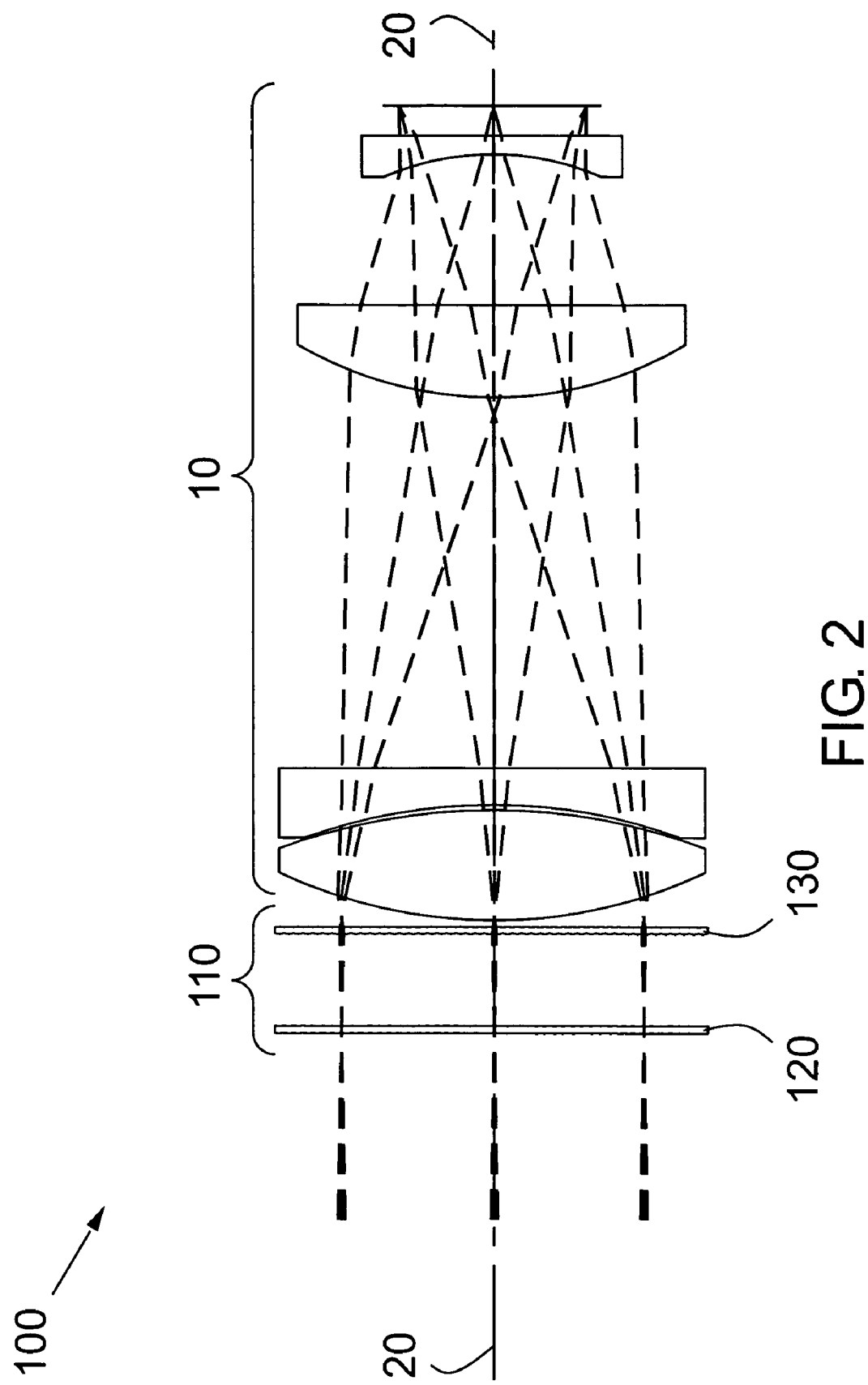
FIG. 2 is a schematic sectional view of a compact telephoto imaging system in accordance with an embodiment of the present invention, taken along the optical axis.

Reference is made to FIG. 2, which is a schematic sectional view of an embodiment of this invention 100, taken along the optical axis 20. In the operation of this embodiment, light is imaged through an array of miniaturized (micro-optic) afocal optical systems 110, in this embodiment consisting of two refractive planar lens array elements 120 and 130, onto an imaging system, in this embodiment consisting of the conventional imaging system 10 illustrated in FIG. 1. The angular magnification provided by the afocal system of lens array elements 110 maps a modified field of view into the normal field of view of the conventional imaging lens system 10. In this manner the effective focal length of the combined imaging system can be magnified with little increase to the overall length of the system and thereby provides a substantially small telephoto ratio.

Figure 3:
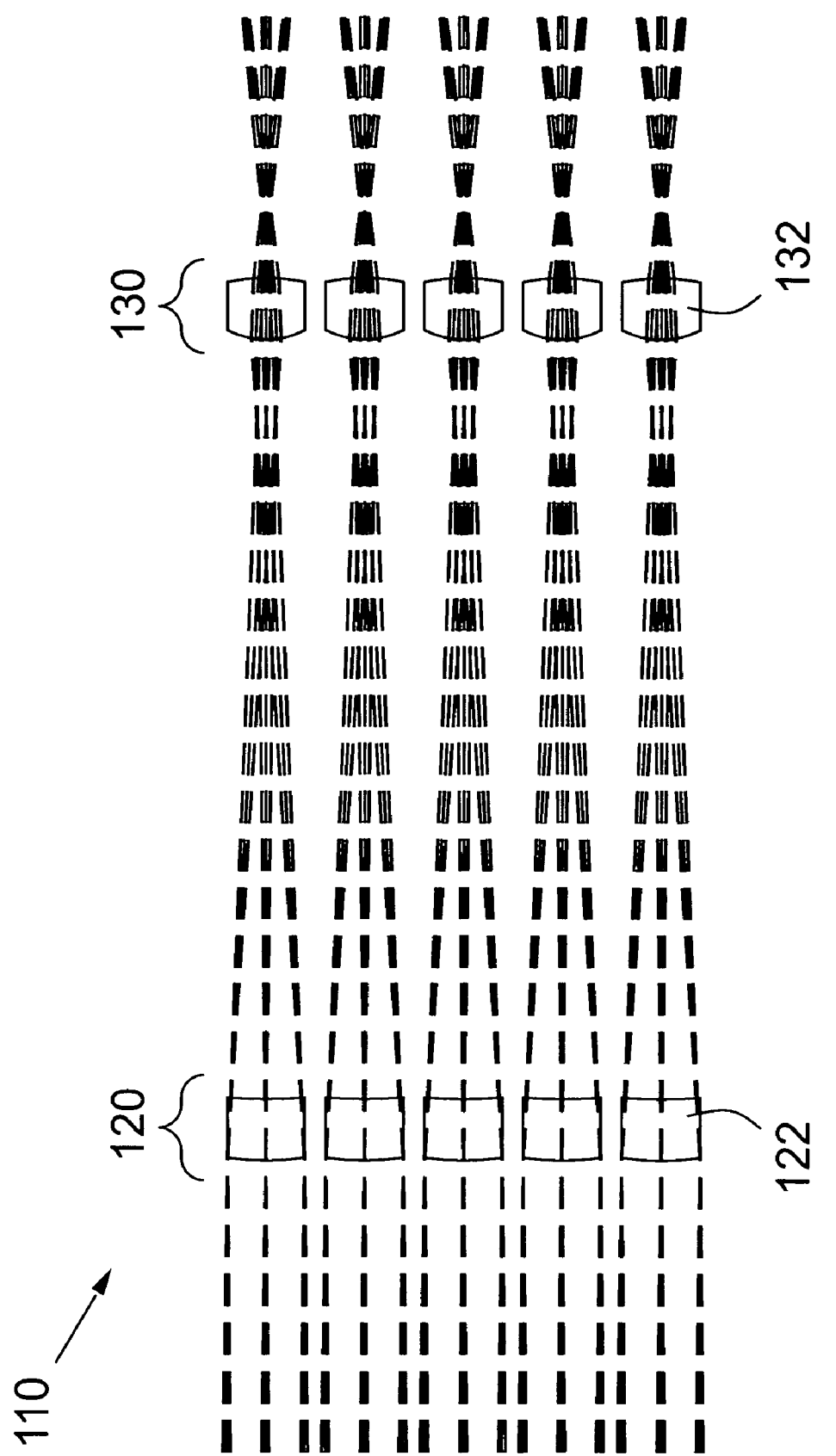
FIG. 3 is an expanded schematic sectional view of a section of the afocal imaging lens array component of the embodiment of the present invention illustrated in FIG. 2 taken along the optical axis.

Reference is made to FIG. 3, which is a schematic sectional view of a section of the array of miniaturized (micro-optic) afocal lens systems 110 in the embodiment of FIG. 2, taken along the optical axis. At each location in the array, there is a miniaturized afocal lens system, in this embodiment consisting of two refractive microlens elements 122 and 132, which provides angular magnification to the system. It should be noted that, although only five miniaturized (micro-optic) afocal lens systems are shown, this is not a limitation of this invention and any pre-determined number of miniaturized (micro-optic) afocal lens systems can be utilized in any one-dimensional or two-dimensional pattern.

Figure 4:
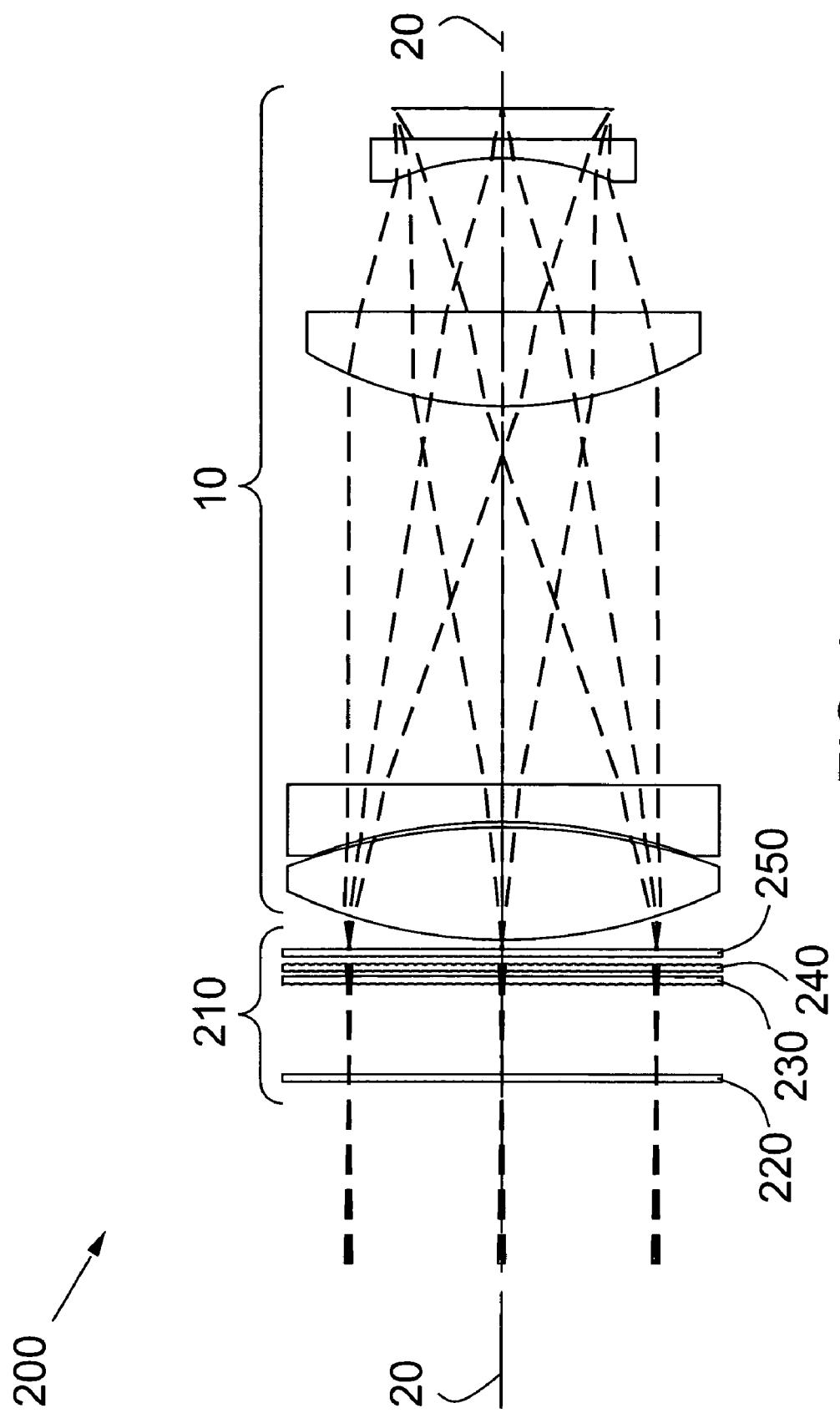
FIG. 4 is a schematic sectional view of a compact telephoto imaging system in accordance with a further embodiment of the present invention, taken along the optical axis.

Reference is made to FIG. 4, which is a schematic sectional view of a further embodiment of this invention 200, taken along the optical axis 20. In the operation of this embodiment, light is imaged through an array of miniaturized afocal lens systems 210, in this embodiment consisting of four refractive planar lens array elements 220, 230, 240, and 250, onto an imaging system, in this embodiment consisting of the conventional imaging system 10 illustrated in FIG. 1. Similar to FIG. 3, at each location in the array there is a miniaturized afocal lens system that provides angular magnification to the system. The angular magnification provided by the afocal system of planar lens array elements 210 maps a modified field of view into the normal field of view of the conventional imaging lens system 10. In this manner the effective focal length of the combined imaging system can be magnified with little increase to the overall length of the system and thereby provides a substantially small telephoto ratio.

Figure 5:
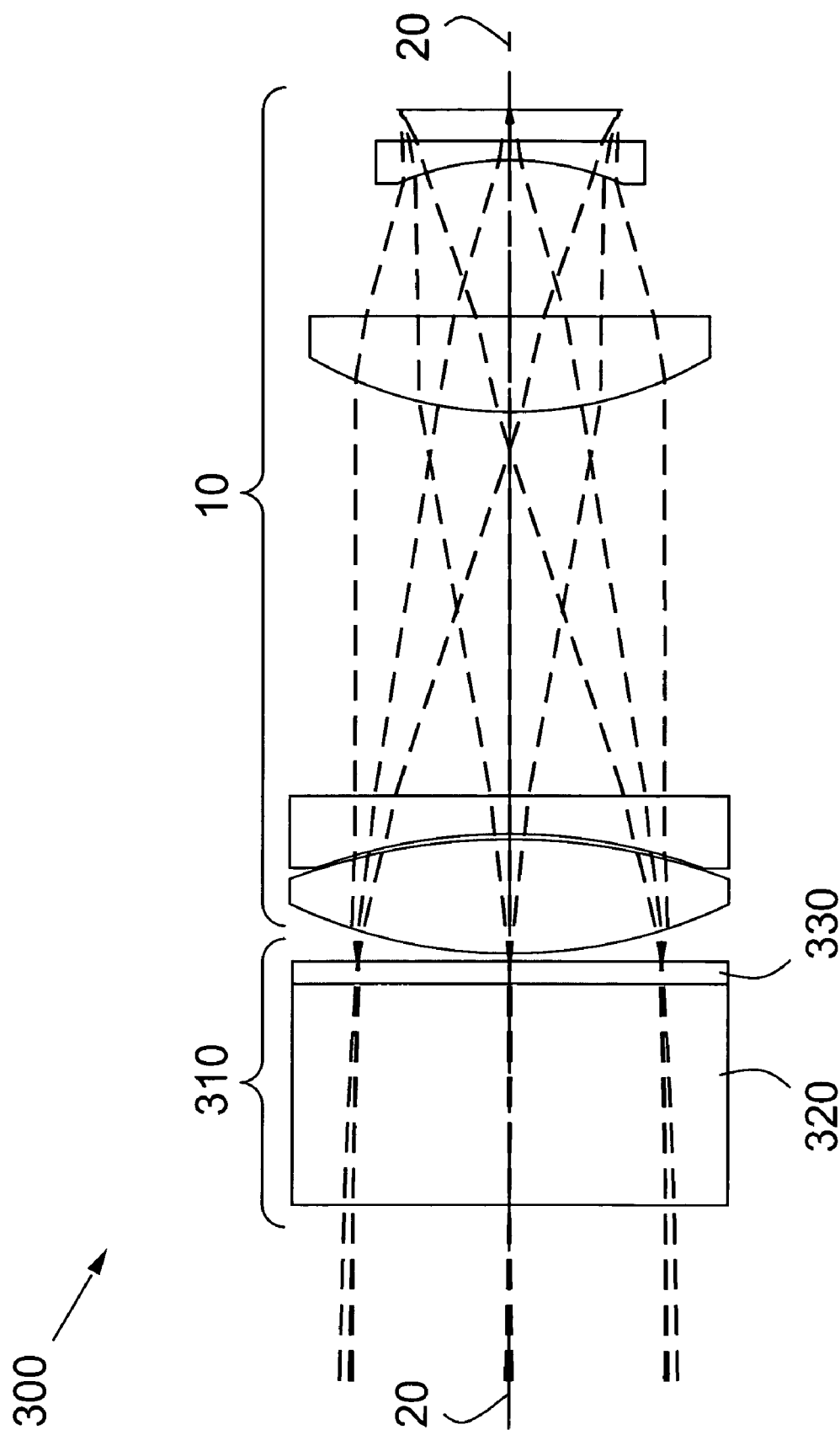
FIG. 5 is a schematic sectional view of a compact telephoto imaging system in accordance with a still further embodiment of the present invention, taken along the optical axis.

Reference is made to FIG. 5, which is a schematic sectional view of a still further embodiment 300 of this invention, taken along the optical axis 20. In the operation of this embodiment, light is imaged through an array of miniaturized afocal lens systems 310, in this embodiment consisting of two refractive planar gradient index lens array elements 320 and 330, onto an imaging system, in this embodiment consisting of the conventional imaging system 10 illustrated in FIG. 1. The angular magnification provided by the afocal system of planar gradient index (GRIN) rod lens array elements maps a modified field of view into the normal field of view of the conventional imaging lens system 10. In this manner the effective focal length of the combined imaging system can be magnified with little increase to the overall length of the system and thereby providing a substantially small telephoto ratio.

Figure 6:
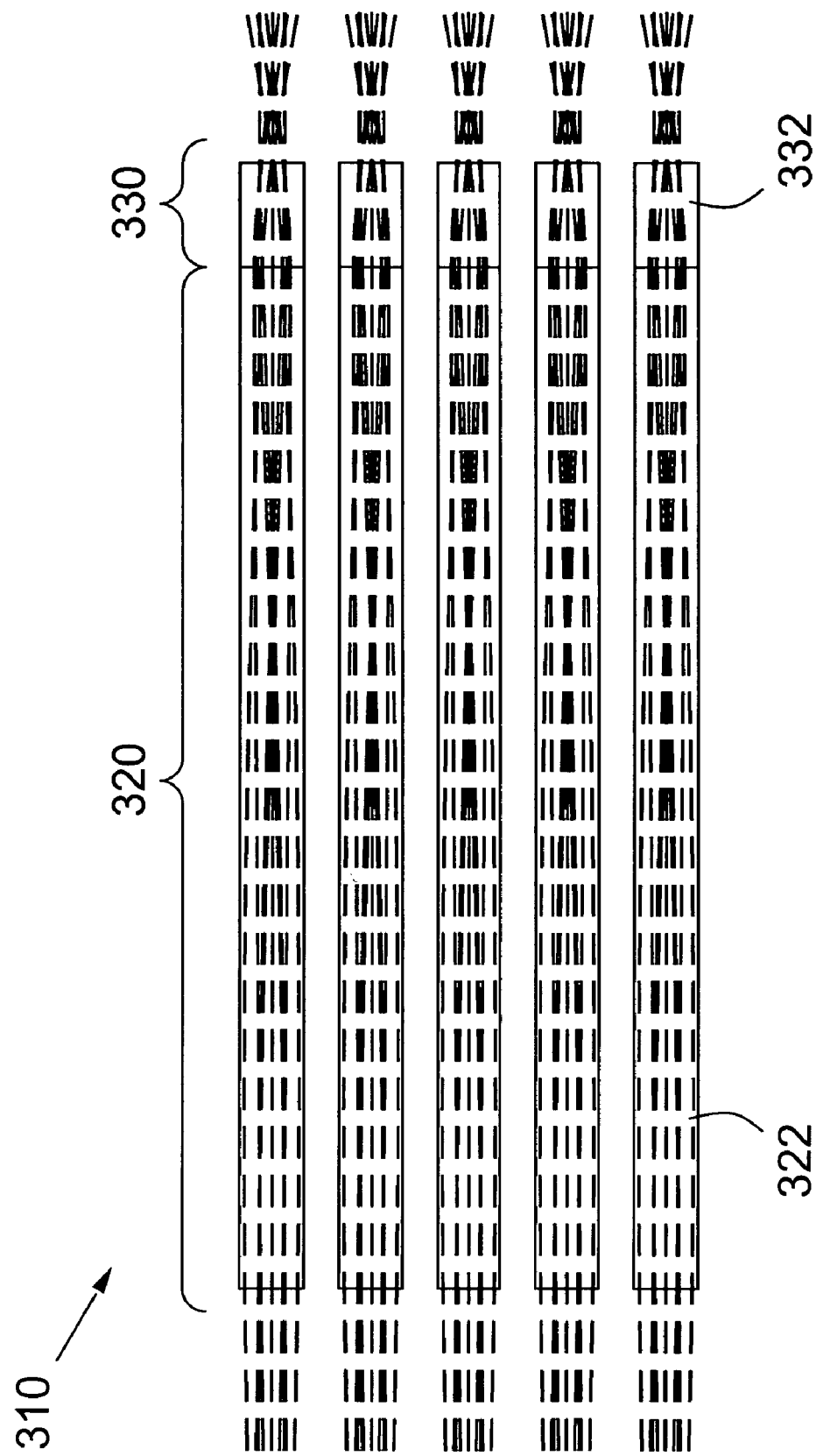
FIG. 6 is an expanded schematic sectional view of a section of the afocal imaging GRIN rod lens array component of the embodiment of the present invention illustrated in FIG. 5 taken along the optical axis.

Reference is made to FIG. 6, which is a schematic sectional view of a section of the array of miniaturized (micro-optic) afocal lens systems 310 in the embodiment of FIG. 5, taken along the optical axis. At each location in the array, there is a miniaturized afocal lens system, in this embodiment consisting of two refractive gradient index (GRIN) rod lens elements 322 and 332, which provides angular magnification to the system. It should be noted that, although only five miniaturized (micro-optic) a focal lens systems are shown in FIG. 6, this is not a limitation of this invention and any pre-determined number of miniaturized (micro-optic) afocal lens systems can be utilized in any one-dimensional or two-dimensional pattern.

Figure 7B:
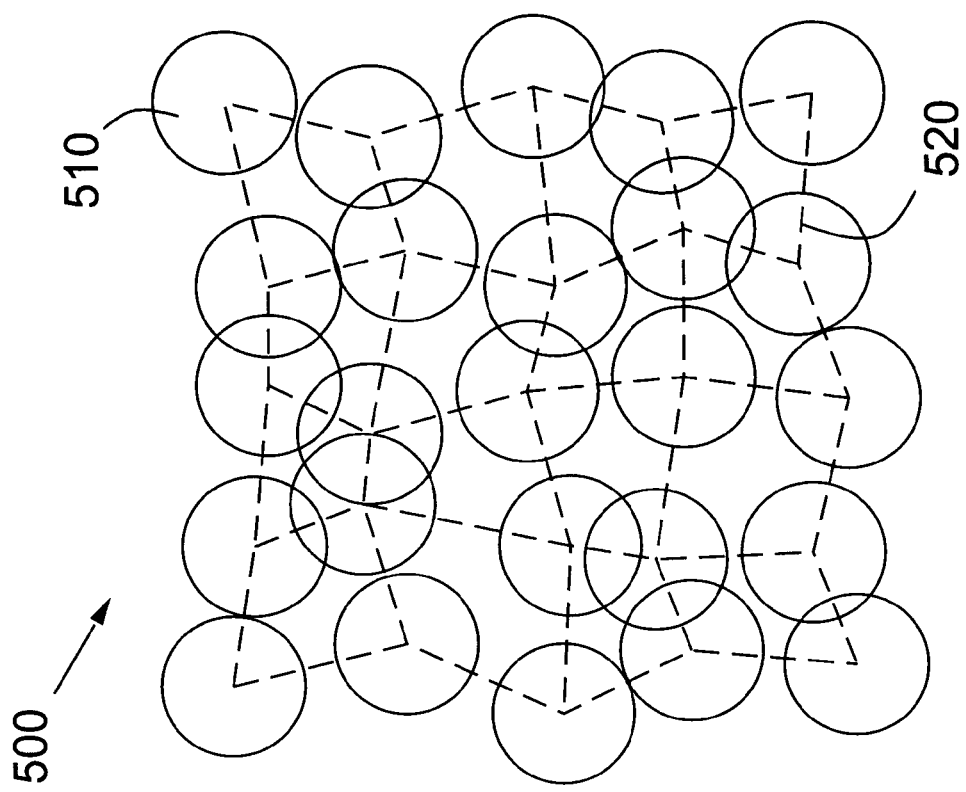
FIGS. 7A and 7B are schematic representations of embodiment of a planar array of miniature (micro-optic) elements arranged in a periodic and non-periodic structure respectively.
Figure 7A:
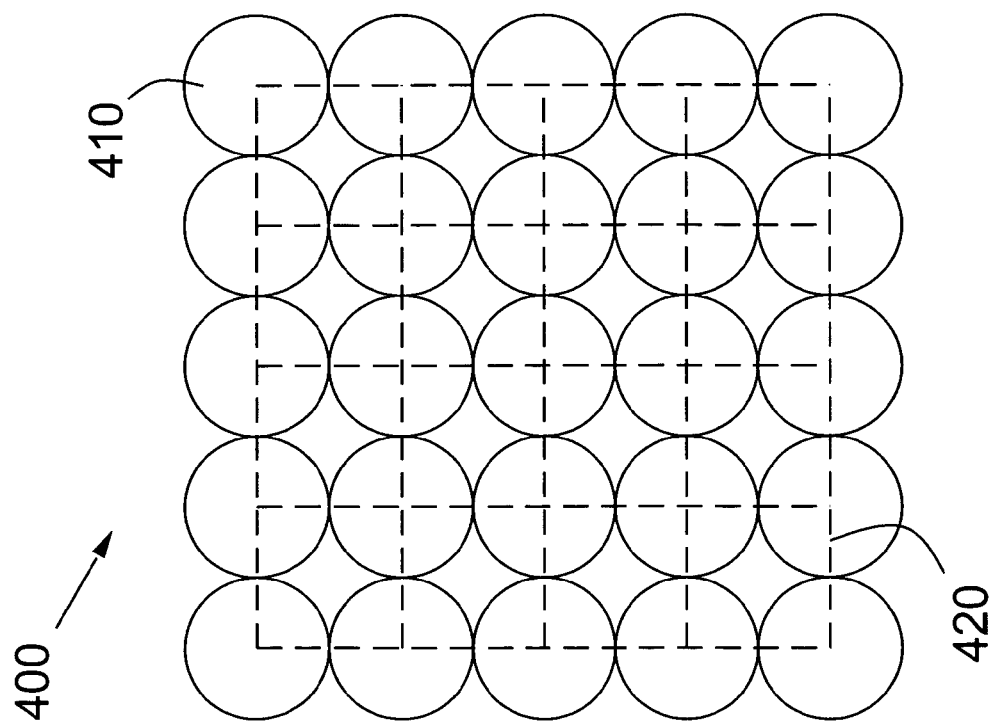

In some embodiments, the angular magnification of the array of afocal lens systems can result in the entrance pupil of the imaging lens system being under-filled. Reference is made to FIG. 7A, which represents a planar array of miniature (micro-optic) elements 400, where the optical elements 410 are arrayed in a periodic structure 420. If a periodic structure such as, but not limited to, the periodic array 400 is used in the array of afocal lens systems in these embodiments, a modulation of the system modulation transfer function (MTF) can result. Reference is made to FIG. 7B, which represents a planar array of miniature (micro-optic) elements 500, where the optical elements 510 are arrayed in a non-periodic structure 520 such that the autocorrelation of the array structure has a substantially uniform distribution. Embodiments utilizing a non-periodic array structure such as, but not limited to, the non-periodic array 500 could substantially reduce or avoid the modulation of the system modulation transfer function (MTF).

The form of the miniaturized afocal lens systems that make up the array can be any combination of refractive, diffractive, gradient index, or other optical element known in the art. These components need only be miniaturized and placed into arrays to form the miniaturized (micro-optic) afocal lens arrays described above.

It should be noted that, although the arrays of miniaturized (micro-optical) afocal optical systems disclosed above comprise two or four planar array elements, the number of planar array elements is not a limitation of this invention.

Although the invention has been described with respect to various embodiments, it should be realized that this invention is also capable of a wide variety of further and other embodiments within the spirit and scope of the appended claims.

What is claimed is:

1. An optical system comprising:
    an array of micro-optic afocal subsystems, said array of micro-optic afocal subsystems being capable of receiving electromagnetic radiation from a source and of transmitting at least a portion of the received electromagnetic radiation; and, an imaging subsystem capable of receiving electromagnetic radiation from said array of micro-optic afocal subsystems and imaging onto an image plane at least a portion of the electromagnetic radiation received from said array of micro-optic afocal subsystems;

an effective focal length of the optical system being magnified over a focal length of said imaging subsystem with a substantially small increase in a length of the optical system.

2. The optical system of claim 1 wherein said array of micro-optic afocal subsystems comprises a plurality of micro-optic planar arrays of optical elements.

3. The optical system of claim 2 wherein said plurality of micro-optic planar arrays of optical elements comprises two micro-optic planar arrays of refractive elements.

4. The optical system of claim 2 wherein said plurality of micro-optic planar arrays of optical elements comprises four micro-optic planar arrays of refractive elements.

5. The optical system of claim 1 wherein a substantially small telephoto ratio is obtained.

6. An optical system comprising:
an array of micro-optic afocal subsystems, said array of micro-optic afocal subsystems being capable of receiving electromagnetic radiation from a source and of transmitting at least a portion of the received electromagnetic radiation; and
an imaging subsystem capable of receiving electromagnetic radiation from said array of micro-optic afocal subsystems and imaging onto an image plane at least a portion of the electromagnetic radiation received from said array of micro-optic afocal subsystems;
wherein said array of micro-optic afocal subsystems comprises a plurality of micro-optic planar arrays of optical elements; and
wherein said plurality of micro-optic planar arrays of optical elements comprises two planar arrays of gradient index (GRIN) rod lenses.

7. An optical system comprising:
an array of micro-optic afocal subsystems, said array of micro-optic afocal subsystems being capable of receiving electromagnetic radiation from a source and of transmitting at least a portion of the received electromagnetic radiation; and
an imaging subsystem capable of receiving electromagnetic radiation from said array of micro-optic afocal subsystems and imaging onto an image plane at least a portion of the electromagnetic radiation received from said array of micro-optic afocal subsystems;
wherein said array of micro-optic afocal subsystems comprises a non periodic planar array structure.

8. An optical system comprising:
an array of micro-optic afocal subsystems optically disposed to receive electromagnetic radiation from a source; and,
an imaging subsystem optically disposed to receive electromagnetic radiation from said array of micro-optic afocal subsystems and to image electromagnetic radiation onto an image plane;
said array of micro-optic afocal subsystems being also optically disposed to provide electromagnetic radiation to said imaging subsystem;
an effective focal length of the optical system being magnified over a focal length of said imaging subsystem with a substantially small increase in a length of the optical system.

9. The optical system of claim 8 wherein said array of micro-optic afocal subsystems comprises a plurality of micro-optic planar arrays of optical elements.

10. The optical system of claim 9 wherein said plurality of micro-optic planar arrays of optical elements comprises two micro-optic planar arrays of refractive elements.

11. The optical system of claim 9 wherein said plurality of micro-optic planar arrays of optical elements comprises four micro-optic planar arrays of refractive elements.

12. The optical system of claim 8 wherein a substantially small telephoto ratio is obtained.

13. An optical system comprising:
an array of micro-optic afocal subsystems optically disposed to receive electromagnetic radiation from a source; and
an imaging subsystem optically disposed to receive electromagnetic radiation from said array of micro-optic afocal subsystems and to image electromagnetic radiation onto an image plane;
said array of micro-optic afocal subsystems being also optically disposed to provide electromagnetic radiation to said imaging subsystem;
wherein said array of micro-optic afocal subsystems comprises a plurality of micro-optic planar arrays of optical elements; and
wherein said plurality of micro-optic planar arrays of optical elements comprises two planar arrays of graded index (GRIN) rod lenses.

14. An optical system comprising:
an array of micro-optic afocal subsystems optically disposed to receive electromagnetic radiation from a source; and
an imaging subsystem optically disposed to receive electromagnetic radiation from said array of micro-optic afocal subsystems and to image electromagnetic radiation onto an image plane;
said array of micro-optic afocal subsystems being also optically disposed to provide electromagnetic radiation to said imaging subsystem;
wherein said array of micro-optic afocal subsystems comprises a non periodic planar array structure.

15. An optical system comprising:
an array of micro-optic afocal subsystems comprised of at least two micro-optic planar arrays of refractive elements; said array of micro-optic afocal subsystems being capable of receiving electromagnetic radiation from a source and of transmitting at least a portion of the received electromagnetic radiation; and,
an imaging subsystem capable of receiving electromagnetic radiation from said array of micro-optic afocal subsystems and imaging onto an image plane at least a portion of the electromagnetic radiation received from said array of micro-optic afocal subsystems;
said array of micro-optic afocal subsystems being also optically disposed to provide electromagnetic radiation to said imaging subsystem;
wherein said array of micro-optic afocal subsystems comprises a non periodic planar array structure.

16. An optical system comprising:
an array of micro-optic afocal subsystems comprised of at least two planar arrays of graded index (GRIN) rod lenses; said array of micro-optic afocal subsystems being capable of receiving electromagnetic radiation from a source and of transmitting at least a portion of the received electromagnetic radiation; and,
an imaging subsystem capable of receiving electromagnetic radiation from said array of micro-optic afocal subsystems and imaging onto an image plane at least a portion of the electromagnetic radiation received from said array of micro-optic afocal subsystems;

said array of micro-optic afocal subsystems being also optically disposed to provide electromagnetic radiation to said imaging subsystem;

wherein said array of micro-optic afocal subsystems comprises a non periodic planar array structure.

17. A method for obtaining a small telephoto ratio in an optical system, the method comprising the steps of:

providing an array of micro-optic afocal subsystems;

angularly magnifying an input field of view utilizing the array of micro-optic afocal subsystems; and, providing the angularly magnified field of view to an imaging subsystem;

whereby a small telephoto ratio is obtained for the optical system.

* * * * *